United States Patent

[11] 3,627,389

[72] Inventors Philip H. Foote, Jr.
Los Angeles, Calif.;
Earl M. Curtis, Torrington, Conn.
[21] Appl. No. 849,806
[22] Filed Aug. 12, 1969
[45] Patented Dec. 14, 1971
[73] Assignee The Torrington Company
Torrington, Conn.

[54] SELF-ALIGNING BEARING ASSEMBLY
7 Claims, 7 Drawing Figs.
[52] U.S. Cl. ............................................... 308/72
[51] Int. Cl. ............................................ F16c 23/04
[50] Field of Search ........................... 308/72, 29, 196, 236

[56] References Cited
UNITED STATES PATENTS
3,535,006 10/1970 Orkin et al. ................... 308/22
1,340,663 5/1920 Maire ........................... 308/196
2,681,259 6/1954 White ........................... 308/72
3,118,711 1/1964 Bachelet et al. .............. 308/236
3,464,747 9/1969 Schmidt ......................... 308/72

Primary Examiner—Martin P. Schwadron
Assistant Examiner—Frank Susko
Attorneys—Frank S. Troidl and David W. Tibbott ABSTRACT: This disclosure relates to a self-aligning bearing assembly which includes an inner race member having a part spherical outer surface, and an outer race member having a part spherical inner surface cooperable with the inner race member surface, the outer race member being split in an axial direction so as to facilitate the assembly of the inner race member within the outer race member. A sheet metal cylinder is placed around the assembled inner race member and outer race member to retain the outer race member against separation with this same cylinder being utilized to fixedly secure the bearing assembly within a housing.

PATENTED DEC 14 1971 3,627,389
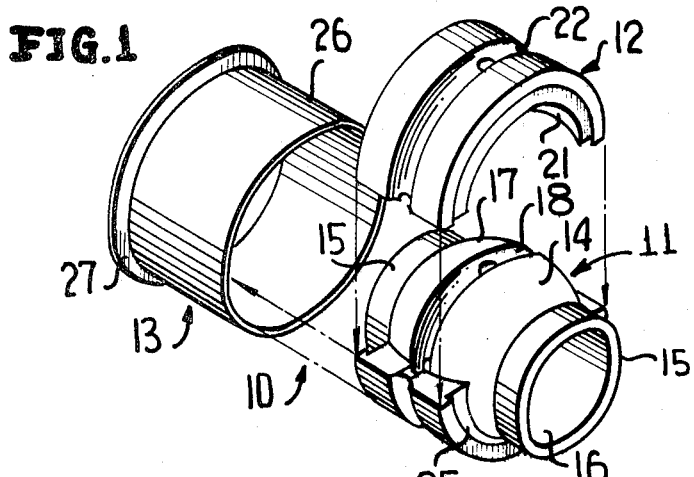
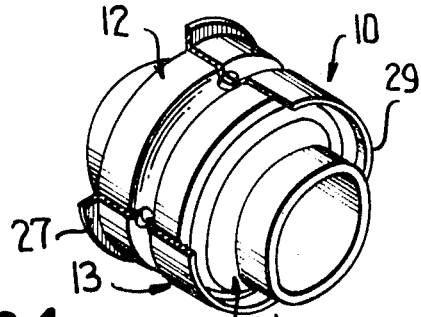
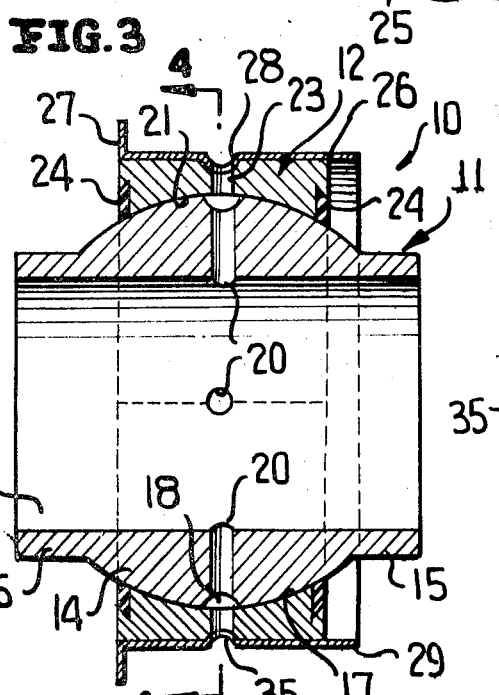
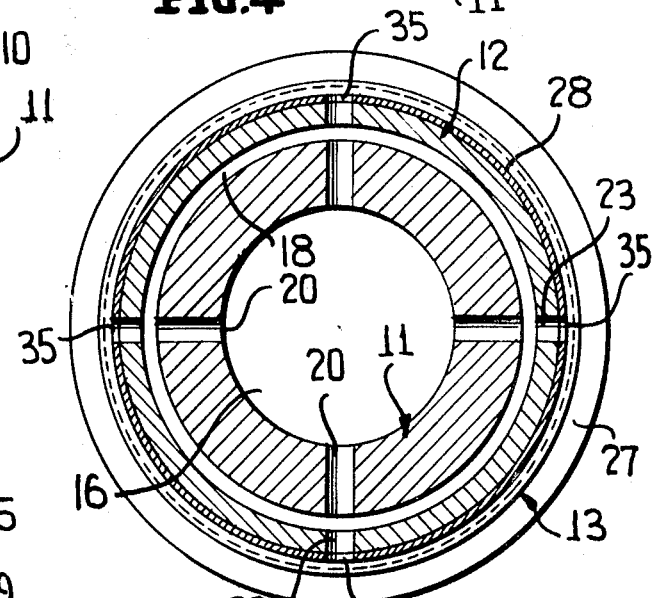
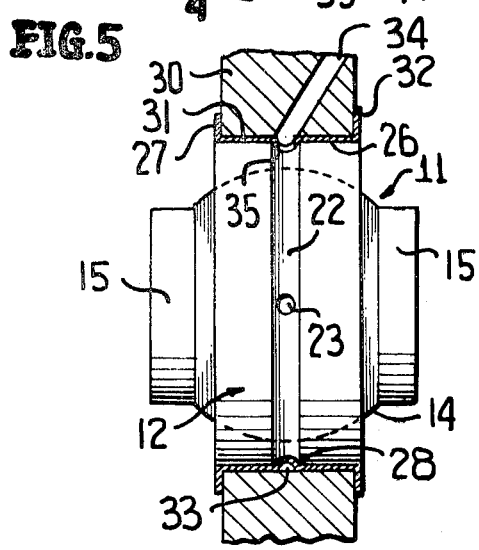
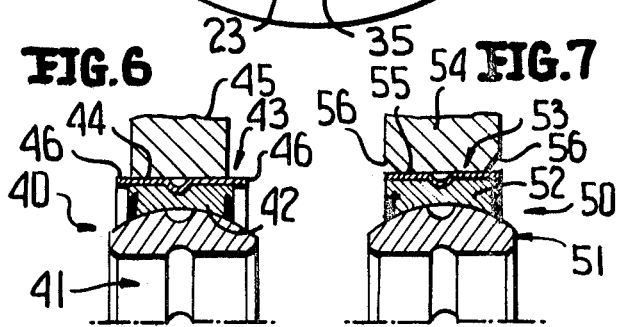
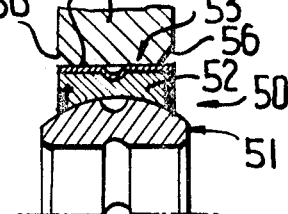
INVENTORS
PHILIP H. FOOTE, Jr.
& EARL M. CURTIS
By
Dilbre, Brown, Ramik & Holt
ATTORNEYS

SELF-ALIGNING BEARING ASSEMBLY

This invention relates in general to new and useful improvements in self-aligning bearings, and more particularly to a self-aligning bearing assembly of the ball-bushing type wherein the outer race member is fractured at least along one axial line so as to facilitate the assembly of the ball bushing within the outer race member, and more particularly relates to a novel combined retaining and mounting member which completes the bearing assembly.

It will be readily apparent that inasmuch as the outer race member is of a split construction, some means must be provided for preventing the undesired separation of the outer race member. Accordingly, in the past, a sleeve has been tightly fitted around the outer race member so as to restrain the same against outward expansion and separation. Such a sleeve has been successful for the intended purpose, but has not been advantageously utilized.

In accordance with this invention, it is proposed to utilize the sleeve not only as a retaining member, but also as a mounting member. Thus, the sleeve may have dual utility without requiring materially additional material. In its function as a combined retaining and mounting member, the sleeve will be provided with flanges at the opposite ends thereof. These flanges, when bent relative to a housing member, will securely anchor the bearing assembly within the housing.

In one form of the invention, the combined retaining and mounting member is provided with a preformed out-turned flange at one end thereof, which flange, when the bearing assembly is placed within a housing, abuts against one face of the housing so as to locate the bearing assembly. However, if desired, the preformed flange may be omitted and both flanges formed in situ after the bearing assembly has been positioned within the housing member.

It is also proposed that the bore of the housing member in which the bearing assembly is seated may be chamfered at the opposite ends thereof and after the bearing assembly has been positioned within the housing member, the opposite ends of the combined retaining and mounting member may be outwardly flanged into the chamfers to retain the bearing assembly in position relative to the housing member.

A further object of this invention is to advantageously utilize a sheet metal cylinder in a self-aligning bearing assembly both as a retaining member and a mounting member, the cylinder being readily secured to the outer race member so as to prevent separation thereof by providing the outer race member with a peripheral groove and shaping the cylinder, when in place on the outer race member, so as to define a rib which projects into the groove so as to lock together the outer face member and the cylinder.

A still further object of this invention is to advantageously utilize a groove formed on the outer surface of the cylinder during the formation of the rib as a lubricant passage for internally lubricating the bearing assembly.

With the above, and other objects in view that will hereinafter appear, the nature of the invention will be more clearly understood by reference to the following detailed description, the appended claims and the several views illustrated in the accompanying drawings:

In the drawings:

FIG. 1 is an exploded perspective view of the components of the self-aligning bearing assembly.

FIG. 2 is a perspective view of the bearing assembly of FIG. 1 in its assembled condition, a portion of the combined retaining and mounting member being broken away and shown in section.

FIG. 3 is an enlarged vertical axial sectional view through the bearing assembly and shows further the specific details thereof.

FIG. 4 is an enlarged transverse sectional view taken along the line 4—4 of FIG. 3.

FIG. 5 is a fragmentary sectional view taken through a housing and shows mounted therein the bearing assembly.

FIGS. 6 and 7 are half sectional views of modified forms of bearing assemblies seated in housing member prior to the formation of mounting flanges.

Referring now the drawings in detail, it will be seen that there are illustrated the details of the self-aligning bearing assembly which is the subject of this invention, the bearing assembly being generally identified by the numeral 10. The bearing assembly basically includes an inner race member, which is identified by the numeral 11, an outer race member, which is identified by the numeral 12, and a combined retaining and mounting member, which is identified by the numeral 13.

The inner race member 11 is in the form of a spherical bushing 14 which may have axial extensions or flanges 15 at the opposite ends thereof. The inner race member 11 is provided with an axial bore 16 for the reception of a shaft or other mounting member, including a bolt, pin, etc. If desired, the bore 16 may be provided with a suitable liner, such as an aluminum bronze liner. This is optional.

It is to be noted that the spherical bushing 14 has a part spherical outer surface 17 which is interrupted by an annular lubricant groove 18. In addition, the spherical bushing may be provided with radial lubricant passages 20 to facilitate the application of a lubricant to the internal surface of the bore 16.

The outer race member 12 is formed with a part spherical internal outer race surface 21 which mates with the inner race surface 17 of the inner race member 11. Thus, the outer race member 12 has a fit with the inner race member 11 in a manner wherein the inner race member is firmly supported relative to the outer race member 12 while being free for relative rotational and rocking movement. The outer surface of the outer race member 12 is generally cylindrical and is provided with a centrally located annular groove 22.

It is to be understood that the outer race member 12 is of a split construction in order to facilitate the positioning of the inner race member 11 therein. To this end, the outer race member 12 is axially fractured and while the outer race member 12 illustrated in the drawing is of a two-piece construction, it is to be understood that a single axial fracture may be formed in the outer race member 12 and the outer race member 12 spread open sufficiently during the assembly of the self-aligning bearing to permit the insertion of the inner race member 11 therein.

It is also to be noted that the outer race member 12 is provided with radial lubricant passages 23 which open into the annular lubricant passage or groove 18 of the inner race member 11 and serve in a manner to be described hereinafter to deliver lubricant for flow both between the surfaces 17 and 21 and into the bore 16. In order that flow of lubricant out between the surfaces 17 and 21 may be restricted and at the same time foreign matter may be excluded in the space between the surfaces, the opposite ends of the outer race member 12 are provided with seals 24. As is best shown in FIG. 1, the ends of the outer race member 12 are provided with annular grooves 25 into which the seals 24 snap.

It will be readily apparent from the foregoing description of the self-aligning bearing that the bearing has two additional requirements. First, suitable means must be provided to prevent the separation of the outer race member 12. Secondly, means must be provided to facilitate the mounting of the bearing in a housing. In accordance with this invention, both functions are performed by the combined retaining and mounting member 13.

The combined retaining and mounting member 13 is preferably formed of sheet metal and is in the form of a cylinder 26 having an out-turned flange 27 formed on one end thereof. It is to be understood that the cylinder 26 has an internal bore of a dimension to be snugly received over the assembled inner race member 11 and outer race member 12. After the cylinder 26 has been telescoped over the outer race member 12, as is shown in FIG. 3, with the flange 27 thereof preferably being coplanar with one end of the outer race member 12, it is fixedly secured to the outer race member 12 by spinning a central portion of the cylinder 26 to define an annular rib 28 which is snugly received in the annular groove 22 of the outer race member 12. It is to be understood that when the combined retaining and mounting member 13 is properly assembled with the outer race member 12, as is shown in FIG. 3, the outer race member 12 is tightly restrained against separation while the combined retaining and mounting member 13 is fixed against relative axial movement with respect to the outer race member 12.

It is to be noted from FIG. 3 that in the assembled state of the self-aligning bearing assembly 10, the combined retaining and mounting member 13 has the cylinder 26 thereof projecting axially beyond the outer race member 12 remote from the flange 27 in the form of a lip or projection 29. This lip or projection 29 is utilized in the mounting of the bearing assembly 10 in a manner to be described hereinafter.

It is to be understood that the self-aligning bearing assembly 10 may be sold in the form illustrated in FIGS. 2 through 4. However, it is intended that the bearing assembly 10 be mounted in a housing in the manner best illustrated in FIG. 5. A suitable housing, such as the housing 30, is provided with a bore 31 of a size to snugly receive the cylinder 26. The bearing assembly 10 is pressed into the housing bore 31 until the flange 27 abuts one face of the housing. Thereafter, the lip or projection 29 of the cylinder 26 is swaged or otherwise shaped so as to define a second out-turned flange 32 which is disposed generally parallel to the flange 27 and is in face-to-face contact with the adjacent face of the housing 30. Thus, the flanges 27 and 32 anchor the bearing assembly 10 against axial movement relative to the housing 30 while the press fitting of the cylinder 26 into the housing 30 prevents relative rotation between the housing 30 and the combined retaining and mounting member 13.

It is to be noted that when the bearing assembly 10 is mounted within the housing 30, the annular rib 28 of the cylinder 26, in cooperation with the housing 30, defines an annular lubricant groove or passage 33 into which lubricant may be delivered through a lubricant passage 34 formed in the housing 30. In order to facilitate the distribution of lubricant into the interior of the bearing assembly 10, the cylinder 26 is provided with openings or ports 35 aligned with the lubricant passages 23 in the outer race member 12.

From the foregoing, it will be readily apparent that this invention particularly relates to the combined retaining and mounting member 13 which is inexpensively constructed, readily securable in position relative to the outer race member and which readily facilitates the mounting of the bearing assembly within a housing. It will be readily apparent that the combined retaining and mounting member 13 may be readily cut from tubing and after the formation of the flange 27 thereon, it is ready to be assembled with the inner race member 11 and the outer race member 12. The outer race member 12 is readily pressed into the cylinder 26 of the combined retaining and mounting member 13 and the spinning of the annular rib 27 is readily and automatically performed. It will be further apparent that the flange 32 may be readily formed after the bearing assembly 10 has been mounted in place within a housing, such as the housing 30.

Referring now to FIG. 6 in particular, it will be seen that there is illustrated a slightly modified form of self-aligning bearing assembly, which bearing assembly is identified by the numeral 40. The bearing assembly 40 may be of an identical construction with the bearing assembly 10 except that it will not be provided with the preformed flange 27 on the cylinder thereof.

Basically, the self-aligning bearing 40 includes an inner race member 41, an outer race member 42, and a combined retaining and mounting member 43. The inner race member 41 is in the form of a spherical bushing which is seated within the outer race member 42, the outer race member 42 having an inner surface configurated to conform to the outer surface of the inner race member 41. In order that the inner race member 41 may be assembled within the outer race member 42, the outer race member is of a split construction. The outer race member 42 is snugly received in the combined retaining and mounting member 43 so as to prevent separation thereof during usage.

The combined retaining and mounting member 43 is snugly received within a bore 44 of a housing member 45. It is to be noted that the housing member 44 is of a dimension axially of the bearing assembly 40 less than the combined retaining and mounting member 43, this providing at the ends of the member 43 lips 46 which may be readily out-turned to define flanges opposing the opposite faces of the housing member 45 and thus axially position the self-aligning bearing assembly 40 within the housing member 45.

Referring now to FIG. 7 in particular, it will be seen that there is illustrated still another form of self-aligning bearing assembly formed in accordance with this invention, the bearing assembly being generally identified by the numeral 50. The bearing assembly 50 is of a construction very similar to the bearing assembly 40 and includes an inner race member 51, an outer race member 52, and a combined retaining and mounting member 53. It will be noted that the self-aligning bearing assembly 50 differs from the self-aligning bearing assembly 40 only in the axial length of the combined retaining and mounting member 53 and the details of a housing member 54 in which the bearing assembly 50 is mounted. The combined retaining and mounting member 53 is of substantially the same axial extent as the outer race member 52, as is the housing member 54.

The housing member 54 is provided with a bore 55 in which the combined retaining and mounting member 53 is snugly received. The opposite ends of the bore 55 are chamfered as at 56. It will thus be readily apparent that once the bearing assembly 50 has been centered within the housing member 54, the remote ends of the combined retaining and mounting member 53 may be out-turned into tight engagement with the chamfers in the form of flanges which axially position the bearing assembly 51 within the housing member 54.

It is to be understood that in addition to the bearing assembly being formed with or without such optional features as extensions or flanges, aligned bores, etc., other minor variations may be made in the bearing assembly without departing from the spirit of the invention.

We claim:

1. A self-aligning bearing assembly comprising an inner race member having a part spherical outer surface, an outer race member having a part spherical inner surface cooperable with said inner race member surface and a cylindrical outer surface with a circumferential groove, and a combined retaining and mounting member, said outer race member being of axially split construction to facilitate the assembly of said inner race member and said outer race member, said combined retaining and mounting member extending circumferentially around said outer race member thereby retaining said outer race member against separation, and further having an annular rib matingly engaging the circumferential groove in the outer race thereby restraining axial displacement of the outer race, and defining a peripheral lubricant passage in the exterior of said combined retaining and mounting member, and having means thereon facilitating the mounting of said bearing assembly as a unit, said means including a first projecting lip on said combined retaining and mounting member at one end thereof formable into a flange for out-turned engagement with one side of a housing, and a second projecting lip at the other end thereof for the formation of a second out-turned mounting flange operable to cooperate with said first out-turned mounting flange to clamp a housing therebetween.

2. The self-aligning bearing assembly of claim 1 wherein said combined retaining and mounting member is in the form of a cylinder having an out-turned mounting flange at one end thereof.

3. The self-aligning bearing assembly of claim 1 wherein said rib defines a peripheral lubricant passage in the exterior of said combined retaining and mounting member, and aligned radial lubricant passages in said outer race member and said combined retaining and mounting member extending at least from said peripheral lubricant passage into and between said outer race member and said inner race member.

4. The self-aligning bearing of claim 1 together with seals carried by said outer race member at the opposite ends thereof and in sealed engagement with said inner race member.

5. The self-aligning bearing assembly of claim 1 wherein said means for facilitating the mounting of said bearing assembly are in the form of end portions of said combined retaining and mounting member, said combined retaining and mounting member being generally of the same axial extent as said outer race member, and said end portions overlapping said outer race member.

6. The self-aligning bearing arrangement of claim 1 wherein said flange means are flanges engaging remote faces of said housing member.

7. The self-aligning bearing arrangement of claim 1 wherein said housing member has a bore snugly receiving said combined retaining and mounting member, said bore being chamfered at the opposite ends thereof, and said flange means being in the form of out-turned flanges seated in said chamfers.

* * * * *